Nov. 2, 1926.
F. WAGNER
BALANCED VALVE
Filed Nov. 12, 1925
1,605,380
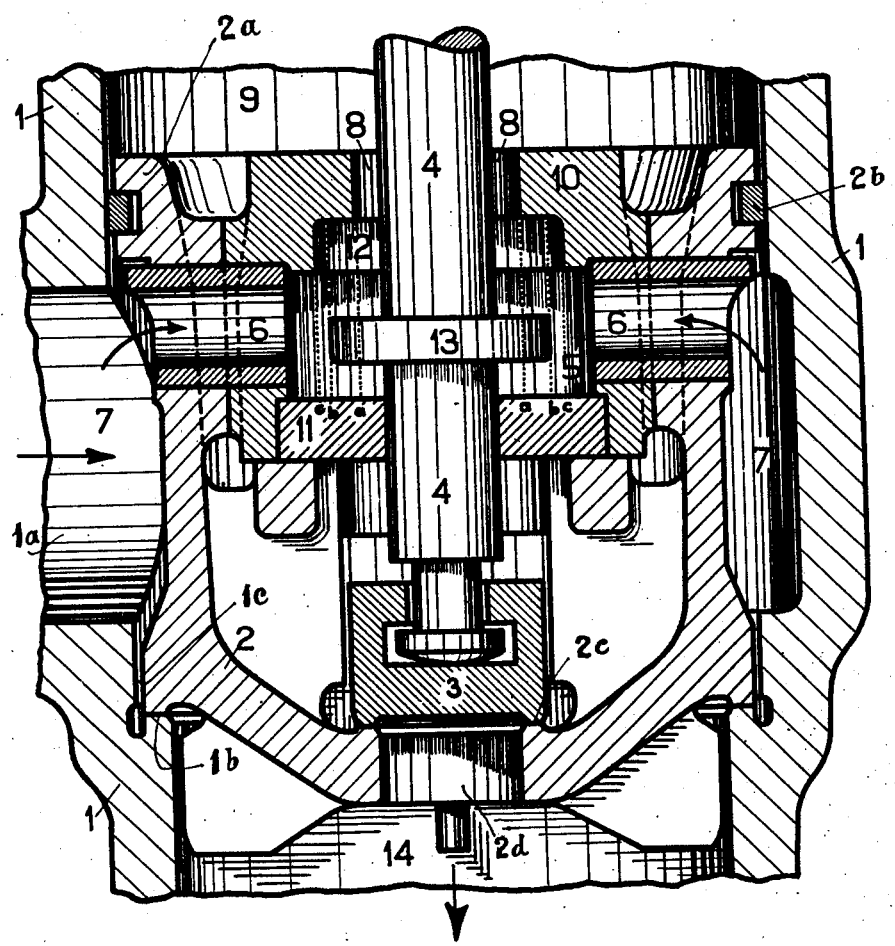

Patented Nov. 2, 1926.

1,605,380

UNITED STATES PATENT OFFICE.

FRITZ WAGNER, OF BERLIN-LICHTERFELDE, GERMANY.

BALANCED VALVE.

Application filed November 12, 1925, Serial No. 68,513, and in Germany July 16, 1925.

My invention relates to balanced valves of the type described in my co-pending application Serial No. 736,239, and it is an object of my invention to prevent hammering in valves of this type.

Such valves as heretofore constructed comprise a main valve and an auxiliary valve, a throttling device operatively connected with said auxiliary valve—which will be termed the "first" throttling device—and another or "second" throttling device constituted by a restricted passage between the live steam supply and the seat of the main valve, which passage controls the flow of steam or other fluid to the area laid open by said main valve, a steam chamber in said main valve which will be referred to as the "valve chamber", and to which live steam is admitted, and an auxiliary chamber in the casing of said main valve.

Live steam flows from said valve chamber to said auxiliary chamber and to the seat of said auxiliary valve.

In such valves, the first throttling device throttles the steam flowing from the valve chamber to the auxiliary chamber in one phase only, involving the drawback that hammering is not prevented under all conditions. This is due to the fact that the forces resulting from the live steam pressure on the top and the bottom of the valve chamber are substantially equal for the operative as well as for the inoperative position of the throttling device and so variations of the pressure in said valve chamber are practically without influence on the motion of the main valve and the motion of the main valve is practically exclusively controlled by the comparatively considerable variations of pressure which the flow of the live steam past the throttling device effects in the auxiliary chamber. As the volume of this chamber is considerable it requires a corresponding time to build up pressure therein and it may occur that vibrations of the main valve due to any cause attain a certain intensity and cause hammering of the valve before it has been possible to build up the pressure required for damping such vibrations in the auxiliary chamber.

The tendency to hammer is particularly marked in valves for highly superheated high-pressure steam.

Hammering is absolutely prevented in my new valve by so modifying the first throttling device that, on relative displacement of the main valve and the rod of the auxiliary valve the flow of live steam to the auxiliary chamber is throttled in two or more phases.

In a preferred embodiment of my invention I provide a chamber in the main valve, and at one end of said chamber there is provided a passage through which extends the spindle. This passage is of larger diameter than the spindle so that there is formed an annular passage around the spindle. At the inner end of this passage there is provided a recess of still larger size, and opening directly into said chamber. On the spindle I provide a piston or plunger of any suitable shape which is smaller than the recess, but larger than the passage or opening beyond the recess, and through which the spindle extends. Thus the piston or plunger may enter the recess, and in doing so, may throttle the passage in two phases, as will be more fully described below.

The second throttling device is the same as described in my cited co-pending application.

In the drawings, I have illustrated a steam valve with a two-phase first throttling device by way of example.

Referring now to the drawings, 1 is the valve casing, 1$^a$ is a pipe connecting said casing to a source of live steam, not shown, 2 is the main valve which is hollow and seated in the casing at its base on an annular seat 1$^b$ to which is connected a steam pipe 14, 2$^a$ is a piston on the top of the valve which is provided with a ring 2$^b$ adapted to slide in the auxiliary steam chamber 9. This chamber is formed in the upper portion of the casing 1 and may be closed by a cover, not shown. 3 is the auxiliary valve which is seated on an annular seat 2$^c$ in the base of the main valve; and 2$^d$ is a hole in the base which is surrounded by said seat 2$^c$. 4 is a rod secured to the auxiliary valve 3 which rod may be operated by any suitable means, not shown. 5 is a steam chamber formed in the main valve 2 and connected with the live steam space 7 which surrounds said main valve, by pipes 6, 6. 8 is an annular passage formed between said rod 4 and the top of said main valve 2 and connecting said valve chamber 5 with the auxiliary chamber 9. 11 is the bottom plate of said valve chamber 5 in which plate the rod 4 has a sliding fit. An annular recess 12 is formed in the top of the main valve 2 at the lower end of the passage 8, and 13 is a piston secured on or integral with, the valve rod 4. The diameter of said piston is smaller than the inside diameter of the recess 12 so that it is able to enter said recess with some clearance.

The piston 13, the recess 12 and the annular passage 8 constitute the first throttling device. The second throttling device is a narrow annular passage 1ᶜ between the valve casing 1 and the body of the main valve 2.

It will be understood that the piston 13 instead of being cylindrical as shown may be of any other shape, for instance, conical.

The operation of my improved valve is as follows:

When the main valve 2 and the auxiliary valve 3 are on their respective seats, as shown, live steam from the pipe 1ᵃ and the space 7 enters the auxiliary chamber 9 through the pipes 6, 6, the valve chamber 5 and the passage 8, and flows to the inside of the hollow valve 2 through passages between the pipes 6.

When the auxiliary valve 3 is opened by its rod 4, steam flows past said valve to the pipe 14 from the pipe 1ᵃ, through the pipes 6, 6, the valve chamber 5, the annular passage 8, the auxiliary chamber 9 and the inside of the main valve 2.

The first throttling phase begins when the clearance between the piston 13 and the lower edge of the recess 12 has become smaller than the clearance at the annular passage 8 and the first throttling phase attains its maximum when the upper face of the piston 13 is at the same level with the lower edge of the recess 12. From this moment, steam will only flow through the suitably proportioned clearance between the piston 13 and the wall of the recess 12. As the area of this annular clearance is comparatively small, the flow to the auxiliary chamber 9 is correspondingly insignificant so that the reduction of pressure in the auxiliary chamber 9 is increased at an even more rapid rate. In other words, a rapidly increasing difference of pressures is set up between the live steam space 7 and the auxiliary chamber 9, and the resultant pressure tends to raise the piston 2ᵃ but is counteracted by the resultant force due to the pressure of the live steam on the bottom plate 11 of the valve chamber 5. The pressure acts on an area which is a projection of the recess 12 and the diameter of which is equal to the inside diameter of the recess 12. The diameter is indicated by the letters c. Therefore, the upward force which tends to raise the piston 2ᵃ is counteracted by the downward force resulting from the weight of the main valve 2, the pressure on the area c—c of the base plate 11, and the reduced pressure in the auxiliary chamber 9. As this downward force exceeds the upward force during the first throttling phase, the main valve remains seated during this phase.

This condition, however, is altered at the beginning of the second throttling phase. This phase begins when the area of the clearance between the upper face of the piston 13 and the lower face of the extension 12 has been reduced below the area of the annular clearance c—b between the piston 13 and the wall of the recess 12. Obviously, this throttling will exert an increasing force on the projection c—c of the recess 12 and, at the same time, will further increase the rate at which the pressure falls in the auxiliary chamber 9. Consequently, the downward force on the main valve is progressively reduced until the upward force acting on the piston 2ᵃ is able to lift said main valve.

When the main valve opens its initial acceleration is reduced to zero by the action of the second throttling device, the restricted clearance 1ᶜ, when the valve has moved through a short distance.

When the valve rod 4 ceases to move, the motion of the main valve will also be arrested as soon as the downward force balances the upward one. The increase of the downward force is due to the fact that when the rod 4 becomes stationary, the main valve continues to rise, increasing the clearance between the upper face of the piston 13 and the lower face of the recess 12, reducing the force acting on said lower face and increasing the force acting on the projected area of said lower face on the base plate 11, the annulus a—c. Besides, the reduction of the throttling action brings about a small increase of the downward force on the piston 2ᵃ. When the clearance between the piston 13 and the lower face of the recess 12 has attained a dimension at which the downward force on the base plate 11, the downward force on the piston 2ᵃ, and the proper weight of the main valve 2 have balanced the upward force on the piston 2ᵃ, the valve 2 is arrested.

This is the position of equilibrium of the main valve in which it remains until its equilibrium is disturbed by the rod 4 being displaced upwards or downwards.

When the rod 4 is raised, the throttling action is increased and the downward force is reduced, so that the relatively increased upward force on the piston 2ᵃ raises the valve 2 as long as the rod 4 is raised. When it becomes stationary, the upward force is balanced as described and the valve 2 ceases to move as soon as the condition of equilibrium is established. When, on the other hand, the rod 4 is lowered, the throttling action is reduced and the downward force is increased which now moves the main valve downwards until, when the rod 4 has again become stationary, the downward force is again reduced to the amount of the upward force and equilibrium is established again.

It will be understood that the main valve 2 is controlled within the limits of the second throttling phase. The duration of said phase is a function of the clearance between the upper face of the piston 13 and the lower face of the recess 12. The range of the phase is therefore very short but within this range the force on the base plate 11 is varied from zero to maximum by varying the position of the piston 13 with regard to the recess 12. The effect of such pressure variation is further increased by the slight variation of pressure acting on the upper face of the main valve 2. With any variation of the position of the piston 13, a corresponding variation of the position of the main valve 2 will be effected. Therefore, the main valve starts immediately when the rod 4 is moved and stops practically immediately on the rod being arrested.

If vibration of the main valve 2 should occur due to any cause, it will be damped so rapidly that hammering is absolutely prevented.

Various modifications may be made in the valve described without departing from the spirit of my invention. I have already alluded to variations in the shape of the piston 13, and I desire it to be understood that although I have shown and described a steam valve my valve may be used for any other fluid.

I claim:

1. A balanced valve comprising a casing, means for supplying fluid under pressure to said casing, a main valve seated in said casing, an auxiliary valve seated in said main valve, means for operating said auxiliary valve, said casing defining an auxiliary chamber and said main valve defining a valve chamber, means for supplying fluid to said valve chamber, a passage connecting said valve chamber and said auxiliary chamber, and of larger diameter than said valve operating means, and a recess connecting said passage and said valve chamber, and of larger diameter than said passage, and a plunger of smaller size than said recess but of larger size than said passage, and operatively connected to said valve operating means so as to be displaced in respect to said recess as said auxiliary valve is displaced in respect to said main valve.

2. Balanced valve comprising a casing, means for supplying fluid under pressure to said casing, a main valve seated in said casing, an auxiliary valve seated in said main valve, means for operating said auxiliary valve, said casing defining an auxiliary chamber and said main valve defining a valve chamber, means for supplying fluid to said valve chamber, a passage connecting said valve chamber and said auxiliary chamber, means operatively connected with said operating means of said auxiliary valve and adapted to restrict the connection between said valve chamber and said auxiliary chamber in a plurality of stages, and a restricted passage formed between said casing and said main valve in advance of the seat of said main valve.

In testimony whereof I have signed my name to this specification.

FRITZ WAGNER.